United States Patent [19]
Evans

[11] 3,834,523
[45] Sept. 10, 1974

[54] CONVEYOR GUIDED BY DYNAMIC VIBRATION ABSORBERS

[75] Inventor: Robley W. Evans, Louisville, Ky.
[73] Assignee: Rexnord, Inc., Milwaukee, Wis.
[22] Filed: Feb. 24, 1972
[21] Appl. No.: 229,158

[52] U.S. Cl. ..................... 198/220 CA, 198/220 DB
[51] Int. Cl. ............................................. B65g 27/00
[58] Field of Search . 198/220 CA, 220 CB, 220 CC

[56] References Cited
UNITED STATES PATENTS
2,951,581  9/1960  Long................................... 198/220
FOREIGN PATENTS OR APPLICATIONS
911,895  3/1959  Great Britain...................... 198/220

*Primary Examiner*—Richard E. Aegerter
*Attorney, Agent, or Firm*—Marshall & Yeasting

[57] ABSTRACT

A long slender vibratory conveyor, supported on isolation springs distributed along its length, is vibrated along an inclined path in response to vibratory force transmitted longitudinally through the conveyor and transverse vibratory forces generated by a plurality of dynamic vibration absorbers spaced at intervals along the length of the conveyor and oriented to suppress vibration normal to the desired inclined path. To reduce the effect of the dynamic vibration absorbers, the absorbers have, in the direction of the inclined path, natural frequencies that are substantially different from the operating frequency of the conveyor. In the event the natural frequency of the conveyor, vibrating laterally as a free beam, is near the operating frequency, the spacing of the dynamic absorbers is selected to locate at least some of the absorbers at antinodes of the lateral vibration.

1 Claim, 4 Drawing Figures

PATENTED SEP 10 1974  3,834,523

INVENTOR.
ROBLEY W. EVANS
BY Marshall & Yeasting
ATTORNEYS

3,834,523

CONVEYOR GUIDED BY DYNAMIC VIBRATION ABSORBERS

BACKGROUND OF THE INVENTION

Long vibratory conveyors carried on cantilever springs from a fixed foundation are relatively easy to build and operate. However, these conveyors often produce undesirable vibrations in the foundation or adjacent structures. Attempts to vibrationally isolate such conveyors, or to counterbalance them, have usually failed because it is difficult, in such isolated or counterbalanced conveyor arrangements, to maintain uniform vibration in a selected direction at each point along the conveyor. Some vibrationally isolated conveyors have been built using dynamic vibration absorbers mounted on the ends of cantilever springs extending normal to the desired vibratory path. Such arrangements, as illustrated in British Pat. No. 911,895, have operated satisfactorily only when the operating frequency was above 1,000 cycles per minute. Attempts to operate below this frequency were unsuccessful.

SUMMARY OF THE INVENTION

According to the invention, a resiliently supported vibratory conveyor is guided along an inclined path of vibration by dynamic vibration absorbers the springs of which are attached firmly to the conveyor structure. Preferably the springs have spring rates such that in a direction parallel to the desired path of vibration the natural frequency of the absorbers is different from the operating frequency of the conveyor, preferably lower. For vibration normal to the desired path of vibration of the conveyor the absorbers are tuned for resonance at the operating frequency. The absorbers thus serve as the equivalent of rigid links from a fixed support to confine the vibratory motion of the conveyor to the desired inclined path without transmitting substantial vibratory force to the support structure.

SPECIFIC DESCRIPTIONS

Figure 1:
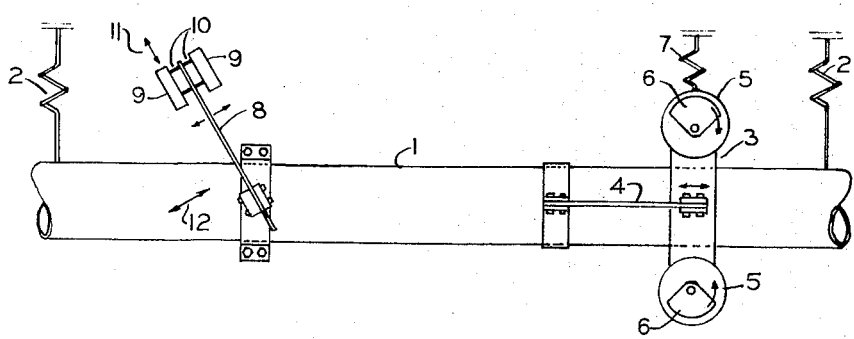
FIG. 1 is a schematic diagram of a prior arrangement of vibratory conveyor which is unsatisfactory for operation below 1,000 cycles per minute, only one of a plurality of like absorbers being shown.

Referring to FIG. 1, a conveyor, similar to that shown in British Pat. No. 911,895, includes an elongated conveyor trough 1 in the form of a large pipe or tube. The trough 1 is supported by a plurality of vibration isolator springs 2 spaced at intervals along its length. The trough, often called a work member, is vibrated longitudinally by a vibration generator 3 that is connected to the trough 1 by a pair of cantilever springs 4 serving as struts.

The vibration generator 3 comprises a pair of drive motors 5, each carrying eccentric weights 6. The weight of the generator 3 is carried by an isolation spring 7. In operation, because of the lack of vertical restraint, the motors synchronize such that the centrifugal forces cancel vertically and add horizontally thus applying a horizontal vibratory force to the trough 1. This horizontal vibratory force is transmitted along the trough 1 stressed as a column.

Inclined cantilever springs 8 are mounted on the conveyor 1 at intervals along its length. Each such spring, at its free end, carries a vibration absorber comprising weights 9 supported on rubber springs 10 attached to the end of the spring 8. The combination of the weights 9 on springs 10 is tuned to the operating frequency of the vibration generator 3. In this system it is intended that the weights 9 vibrate in the direction of the double headed arrow 11 at an amplitude and phase such that the vibratory force transmitted through the cantilver spring 8, as a strut, forces the trough 1 to follow a vibratory path at right angles to the length of the cantilever spring 8 as indicated by the double headed arrow 12. It is also intended that the cantilever spring 8 yield transversely of its length so that there is little or no motion of the weights 9 in a direction parallel to the motion of the trough 1. In practice, to meet this last requirement at operating frequencies below about 1,000 cycles per minute, the cantilever springs 8 have such low spring rates that they bend under the weight of the weights 9 so that instead of acting as stiff struts they act as a weak eccentrically loaded columns with unpredictable spring characteristics that react with the springs 10 to completely destroy the effective tuning of the weights 9 with respect to motion of the trough 1.

According to the invention, this instability is avoided and satisfactory operation achieved at any of the frequencies commonly used in vibratory conveyors by constructing the dynamic vibration absorbers so that the absorber springs are connected to the conveyor with no appreciable yielding in the mounting. The absorber springs themselves are arranged to yield to accommodate the relative motion, in the direction of the trough vibration, between the weights and the trough, while maintaining a substantially fixed spring rate for resonant vibration of the absorber weights normal to the desired trough vibration at the operating frequency.

Figure 2:
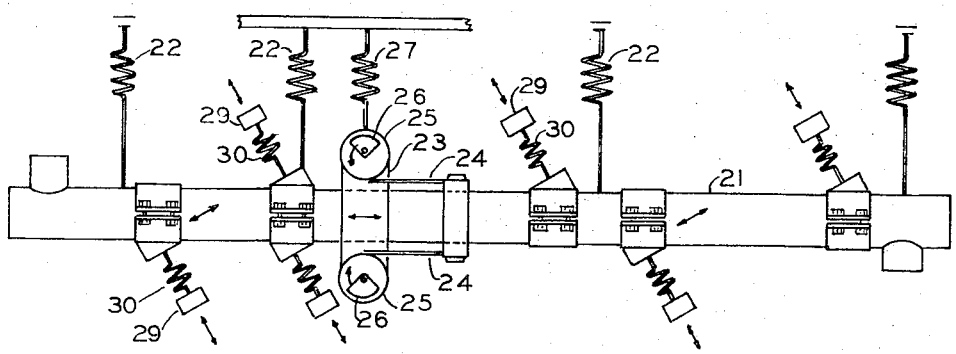
FIG. 2 is a side elevation of a vibratory conveyor incorporating an improved arrangement of conveyor and associated dynamic vibration absorbers suitable for operation at any selected operating speed.

The improved dynamic absorber guided conveyor structure may take any of several forms. For example, in a vibratory conveyor as shown in FIG. 2, a conveyor trough 21 is supported on a series of vibration isolating springs 22 supported from an overhead frame (not shown). The conveyor may also be supported by suitable springs erected from the floor.

The conveyor trough 21 is vibrated longitudinally by a vibration generator 23 coupled to the conveyor through struts 24. The vibration generator includes a pair of motors 25 each carrying eccentric weights 26. The weight of the generator 23 is carried by a vibration isolating spring 27. Since the vibration generator is relatively free to move vertically, the motors 25 synchronize so that the centrifugal forces of the weights 26 cancel in the vertical direction and add in the horizontal direction thus applying a vibratory drive force through the struts 24 to vibrate the conveyor trough 21.

The longitudinal motion of the trough is applied to each of a number of dynamic vibration absorbers 28 spaced along the conveyor. Each absorber comprises, as shown, a weight 29 that is supported on a helical or spiral coil spring 30 attached to the conveyor with its longitudinal axis extending normal to the desired path of vibration of the conveyor. The weight 29 on the coil spring 30 has several degrees of freedom. Assuming for the moment that the conveyor is held stationary, the weight may vibrate in an arc with the spring acting as a cantilever. The natural frequency of this mode is, preferably, not more than half the operating frequency of the conveyor. The weight 29 may also vibrate along the axis of the coil spring. The absorber is tuned so that its natural frequency in this mode is equal (within practical tolerances) to the operating frequency of the conveyor.

With this condition of tuning, the dynamic absorber reacts to the component of the motion of the conveyor trough directed along the axis of the spring 30, and by its vibration, applies a counterforce that reduces that component of motion to practically zero, thus limiting the vibration of the conveyor to motion in a plane normal to the axis of the spring. Since it is desirable that the path of vibratory motion for an ordinary conveyor be in a vertical plane the springs are aligned in a vertical plane.

If several coil springs are used with each of the weights 29, it is necessary to carefully select the positions of the springs and the moment of inertia of the weight 29 to avoid resonant vibration of the weight in an undesired mode of vibration.

A coil spring is particularly suited for this type of service because its spring rate for expansion or contraction along its axis is practically independent of the bending load imposed by the force of gravity acting on the weight.

The absorbers are spaced along the length of the conveyor in much the same way as guide links from a foundation would be spaced. They should be at close enough intervals that, at the operating frequency, the intermediate sections of the conveyor behave as rigid members.

A long conveyor may also vibrate in a transverse mode as a free beam. If some of the absorbers are located at antinodes of such transverse vibration, they not only restrict the motion to vibration along the desired path but also by longitudinal forces transmitted through the trough and their own forces oppose any transverse bending vibration of the conveyor. Thus the absorbers, located at the antinodes of a transverse mode of vibration, serve to stabilize the system.

Figure 3:
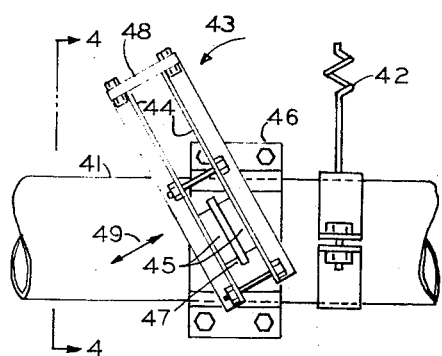
FIG. 3 is a side elevation of a vibratory conveyor section including modified dynamic vibration absorber employing elastomer springs and adapted for use in the conveyor.
Figure 4:
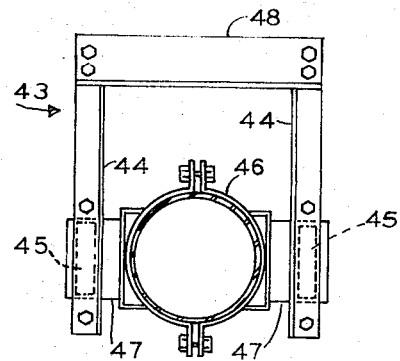
FIG. 4 is a vertical transverse section of the conveyor section and absorber as seen from line 4—4 of FIG. 3.

The same principles may be employed with dynamic absorbers using elastomer springs such as, for example, natural or synthetic rubber. Such an arrangement is shown in FIGS. 3 and 4. As shown, a fragment of a conveyor 41 is supported on a vibration isolating mounting 42 and is adapted to be driven by a vibration generator similar to the generator 23.

A dynamic vibration absorber in the form of a U-shaped frame 43 with bifurcated legs 44 is coupled through rubber shear block springs 45 to a mounting 46 rigidly clamped to the conveyor 41. The mounting 46 includes a pair of laterally directed plates 47 lying in a plane normal to the desired path of vibratory motion. The plates 47 are sandwiched between the rubber shear block springs 45, which, in turn, are sandwiched or clamped between the opposing faces of the legs 44.

Most of the weight of the U-shaped frame 43, shown inverted in the drawings, is concentrated in a heavy cross member 48 rigidly joined to the legs 44.

The rubber shear springs 45 may also yield in compression so that they also serve as a torsionally resilient pivot point for the frame 43, constituting the absorber weight. The pivoting action of the frame 43 allows the conveyor to move along the desired path of vibration, indicated by an arrow 49, without corresponding movement of the heavy crossmember 48.

The rubber shear springs 45 and the total weight of the U-shaped frame 43 are selected so that this combination is resonant at the operating frequency of the conveyor for linear vibratory motion along the length of the legs 44, i.e. normal to the desired path of vibration.

This arrangement thus embodies the same principle of attaching the absorber springs to the conveyor, without intermediate springs, in an arrangement that maintains substantially constant spring rate regardless of the sag of the weights from the force of gravity.

Either of the specifically described arrangements may be satisfactorily employed at any of the commonly used operating frequencies of vibratory conveyors because of the practically complete independence of the natural frequency of the vibratory motion normal to the desired path of vibration of the conveyor from the effects of the conveyor motion along the desired path.

While a vibration generator comprising a pair of contrarotating motors carrying eccentric weights is preferred, various other forms of vibration generators, such as single motors with eccentric weights arranged so that vibratory forces along one axis only are transmitted to the conveyor or crank-connecting rod drives similarly arranged may also be used and are included in the term "vibration generator."

A dynamic vibration absorber, of the type described, when attached to a vibrating body and correctly tuned, appears, insofar as vibratory force is concerned, as a very large mass connected either directly to the vibrating body or through a stiff spring (depending upon tuning) to minimize the amplitude of vibration of the vibrating body at its operating frequency.

I claim:

1. A vibratory conveyor, comprising in combination, an elongated conveyor member, means for applying a vibratory drive force acting along the longitudinal axis of the conveyor member, vibration isolating means for supporting the conveyor member, at least one flat plate that extends laterally from the conveyor member with surfaces of the plate generally normal to the desired path of vibration, a mass including a pair of arms extending either side of said flat plate, and rubber shear springs compressed between said arms and said plate, said mass and said rubber shear springs consituting a vibratory system having a natural frequency generally equal to the operating frequency of the vibratory drive means when vibrating along a path normal to the desired path of vibration of the conveyor member.

* * * * *